US012313506B2

(12) United States Patent
Kupp et al.

(10) Patent No.: US 12,313,506 B2
(45) Date of Patent: May 27, 2025

(54) LEAK DETECTION FOR AIR OPERATED DOUBLE DIAPHRAGM PUMP

(71) Applicant: Warren Rupp, Inc., Mansfield, OH (US)

(72) Inventors: Edward Kupp, Skaneateles, NY (US); Robert Beasley, Mansfield, OH (US)

(73) Assignee: Warren Rupp, Inc., Mansfield, OH (US)

( * ) Notice: Subject to any disclaimer, the term of this patent is extended or adjusted under 35 U.S.C. 154(b) by 194 days.

(21) Appl. No.: 18/165,730

(22) Filed: Feb. 7, 2023

(65) Prior Publication Data

US 2023/0250814 A1 Aug. 10, 2023

Related U.S. Application Data

(60) Provisional application No. 63/307,441, filed on Feb. 7, 2022.

(51) Int. Cl.
*G01M 3/38* (2006.01)
*F04B 43/00* (2006.01)

(52) U.S. Cl.
CPC .............. *G01M 3/38* (2013.01); *F04B 43/009* (2013.01); *F04B 2201/0803* (2013.01)

(58) Field of Classification Search
CPC ....................................................... G01M 3/38
See application file for complete search history.

(56) References Cited

U.S. PATENT DOCUMENTS

| 4,090,179 A * | 5/1978 | Hirano | C21B 7/10 |
|---|---|---|---|
| | | | 73/40.5 R |
| 9,255,573 B2 | 2/2016 | Meuter et al. | |
| 10,317,306 B2 | 6/2019 | Saidi | |
| 10,352,814 B2 | 7/2019 | Enev et al. | |
| 2012/0235822 A1* | 9/2012 | Barson | G08B 17/113 |
| | | | 340/630 |
| 2016/0179993 A1 | 6/2016 | Maturana et al. | |
| 2017/0191974 A1* | 7/2017 | Tamura | G01N 21/6428 |

(Continued)

FOREIGN PATENT DOCUMENTS

| WO | 2017019628 A1 | 2/2017 |
|---|---|---|
| WO | 2020146778 A1 | 7/2020 |

OTHER PUBLICATIONS

"Network Monitoring," Gutermann [online], [retrived on Mar. 8, 2023], Retrieved from Internet <URL: https://en.gutermann-water.com/products/network-monitoring/>, 2 pages.

(Continued)

*Primary Examiner* — Travis R Hunnings
(74) *Attorney, Agent, or Firm* — Tucker Ellis LLP; Patrick F. Clunk

(57) ABSTRACT

One or more systems are disclosed for leak detection for a pump that include a reservoir having a chamber with an inlet and an outlet. The inlet is configured to couple to an exhaust of a pump and the reservoir is configured to create a vortex flow therein. An optical sensor is positioned at a bottom of the reservoir with a detecting portion of the optical sensor extending into the chamber. The vortex flow causes one or more liquids to settle at the bottom of the reservoir on the optical sensor. The one or more liquids are indicative of a leak and the optical sensor is configured to detect the one or more liquids.

19 Claims, 7 Drawing Sheets

(56) References Cited

U.S. PATENT DOCUMENTS

| | | | |
|---|---|---|---|
| 2017/0191993 A1* | 7/2017 | Tamura | G01N 15/1459 |
| 2017/0212530 A1 | 7/2017 | Potucek et al. | |
| 2019/0041842 A1 | 2/2019 | Cella et al. | |
| 2020/0326684 A1 | 10/2020 | Chand et al. | |
| 2020/0393324 A1* | 12/2020 | Rudd | G08B 21/20 |

OTHER PUBLICATIONS

"Pipeline leak detection For Oil and Gas Using IoT," BizIntellia [online], [retrieved on Mar. 8, 2023], Retrieved from Internet <URL:https://www.biz4intellia.com/blog/pipeline-leak-detection-with-iot-in-oil-and-gas/>, 11 pages.

Perez-Padillo, et al., "Design and Implementation of a Pressure Monitoring System Based on IoT for Water Supply Networks," National Library of Medicine, 19 pages, Published online Jul. 30, 2020, doi: 10.3390/s20154247.

"Taking fluid motion IoT to new heights," FLOWSERVE [online], [retrieved on Mar. 8, 2023], Retrieved from Internet <URL:https://www.flowserve.com/en/innovation/iot/>, 4 pages.

"Predictive Analytics On Rotating Equipment," AssetScan, [retrieved on Mar. 8, 2023], Retrieved from Internet <URL:https://assetscan.com/>, 11 pages.

"Sulzer Sense IoT condition monitoring," SULZER, [retrieved on Mar. 8, 2023], Retrieved from Internet <URL:https://www.sulzer.com/en/shared/campaign/wireless-lot-condition-monitoring>, 1 page.

"ABB Ability™ Digital Powertrain—Condition Monitoring for rotating equipment," ABB, [retrieved on Mar. 8, 2023], Retrieved from Internet <URL: https://new.abb.com/motors-generators/service/advanced-services/smart-sensor/smart-sensor-for-pumps>, 6 pages.

"Sintech Innovative products are leading the Industries to Sustainable future," Sintect Smart Pumps, webpage <http://www.sintechpumps.com/smart-pumps-manufacturers/smart-pumps-manufacturers.html>, 12 pages, Retrieved from Internet Archive WayBack Machine <URL:https://web.archive.org/web/20201004231413/http://www.sintechpumps.com/smart-pumps-manufacturers/smart-pumps-manufacturers.html> on Apr. 3, 2023.

"Wilden SafeGuard Remote Performance Monitoring and Alert System," Wilden, webpage <https://www.psgdover.com/wilden/products/wilden-safeguard>, 11 pages, Retrieved from Internet Archive WayBack Machine <URL:https://web.archive.org/web/20211027225509/https://www.psgdover.com/wilden/products/wilden-safeguard> on Apr. 3, 2023.

"No-Code Development for Enterprise Applications and the Internet of Things (Iot)," ThingLogix, webpage <https://www.thinglogix.com/solutions/foundry/>, 8 pages, Retrieved from Internet Archive WayBack Machine <URL:https://web.archive.org/web/20190829110642/https://www.thinglogix.com/solutions/foundry/> on Apr. 3, 2023.

The International Search Report and The Written Opinion of the International Searching Authority, or The Declaration of the related PCT Application No. PCT/US2023/062107, Date of mailing Jun. 6, 2023, 11 pages.

* cited by examiner

LEAK DETECTION FOR AIR OPERATED DOUBLE DIAPHRAGM PUMP

CROSS-REFERENCE TO RELATED APPLICATIONS

This non-provisional application claims the benefit of and priority to U.S. Provisional Application No. 63/307,441, filed Feb. 7, 2022, the disclosure of which is hereby incorporated by reference herein in its entirety.

BACKGROUND

Air-operated pumps, such as diaphragm pumps, are widely used particularly for pumping liquids, solutions, viscous materials, slurries, suspensions, or flowable solids. Double diaphragm pumps are well known for their utility in pumping viscous or solids-laden liquids, as well as for pumping plain water or other liquids, and high or low viscosity solutions based on such liquids. Accordingly, such double diaphragm pumps have found extensive use in pumping out sumps, shafts, and pits, and generally in handling a great variety of slurries, sludges, and waste-laden liquids. Air driven diaphragm pumps offer certain further advantages in convenience, effectiveness, portability, and safety. Double diaphragm pumps are rugged and compact and, to gain maximum flexibility, are often served by a single intake line and deliver liquid through a short manifold to a single discharge line.

Although known diaphragm pumps work well for their intended purpose, several disadvantages exist. For example, air operated double diaphragm (AODD) pumps typically use a check valve (e.g., a ball or flap) to control the flow of fluid inside one or more diaphragm chambers of the pump. Operation of a pump leads to rapid acceleration and deceleration of the fluid being pumped and results in corresponding changes in pressure. This change in pressure can produce cavitation that reduces fluid capacity in the flow area. Collapse of cavitation cavities can wear down parts of the pump and decrease the life of the pump or time between servicing the pump. In some instances, and when the diaphragm reaches end of life, leaks are likely to occur. When pumping liquids that are hazardous, expensive, hard to clean up, or in places that are not monitored, it is desirable to provide an alert when such a leak occurs. Therefore, there is a need for improved leak detection for diaphragm pumps to solve at least the above-mentioned issues.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a leak detector comprises a reservoir having a chamber with an inlet and an outlet. The inlet is configured to couple to an exhaust of a pump and the reservoir is configured to create a vortex flow therein. The leak detector further comprises an optical sensor positioned at a bottom of the reservoir with a detecting portion of the optical sensor extending into the chamber. The vortex flow causes one or more liquids to settle at the bottom of the reservoir on the optical sensor. The one or more liquids are indicative of a leak and the optical sensor is configured to detect the one or more liquids.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

Figure 1:
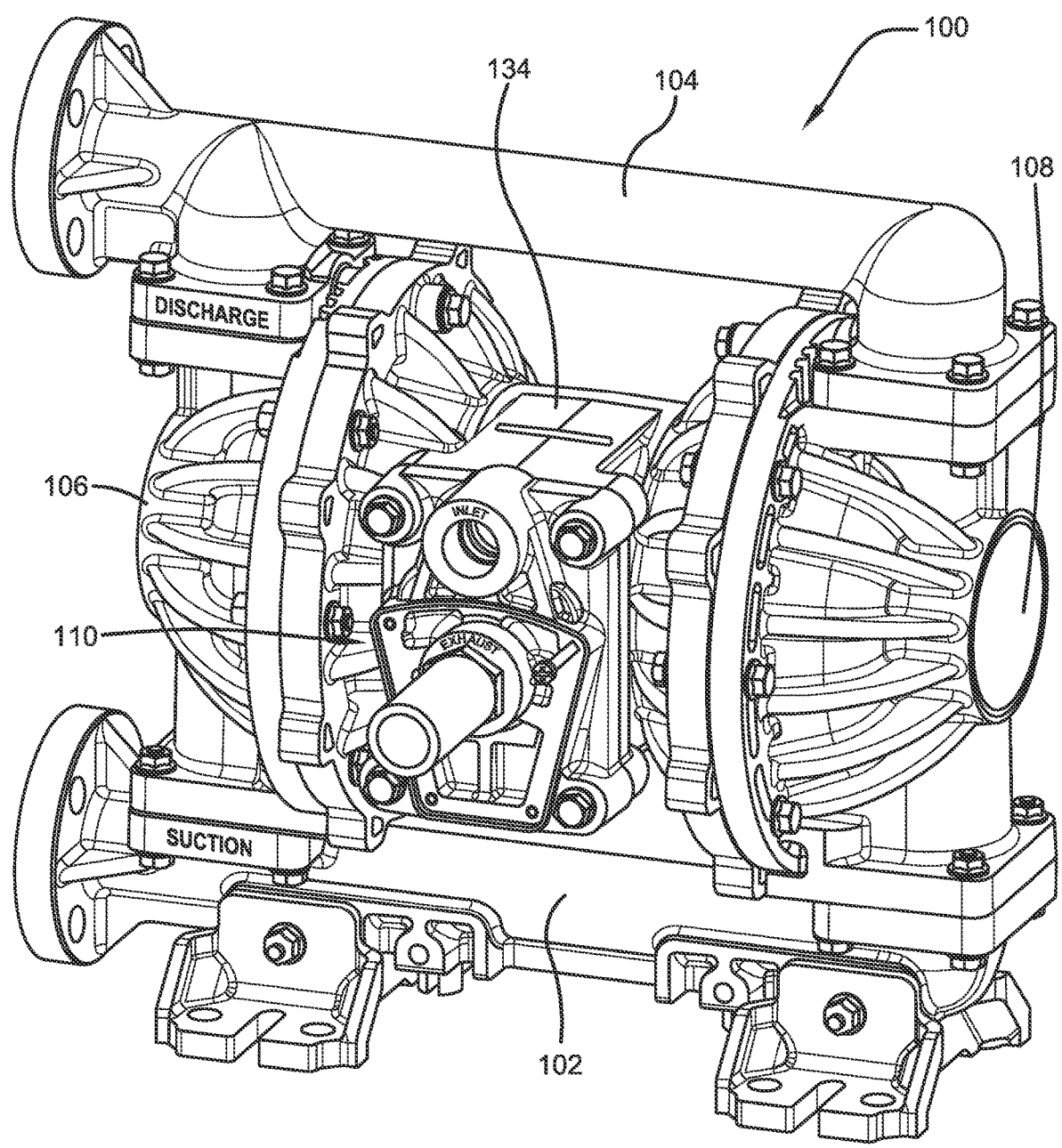
FIG. 1 illustrates a perspective view of a diaphragm pump in connection with which one or more examples can be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein may be suitable for use in different pump applications, such as for different double diaphragm pump applications. That is, the herein disclosed examples can be implemented in different pump systems other than for particular applications, as well as having different pump configurations.

Figure 2:
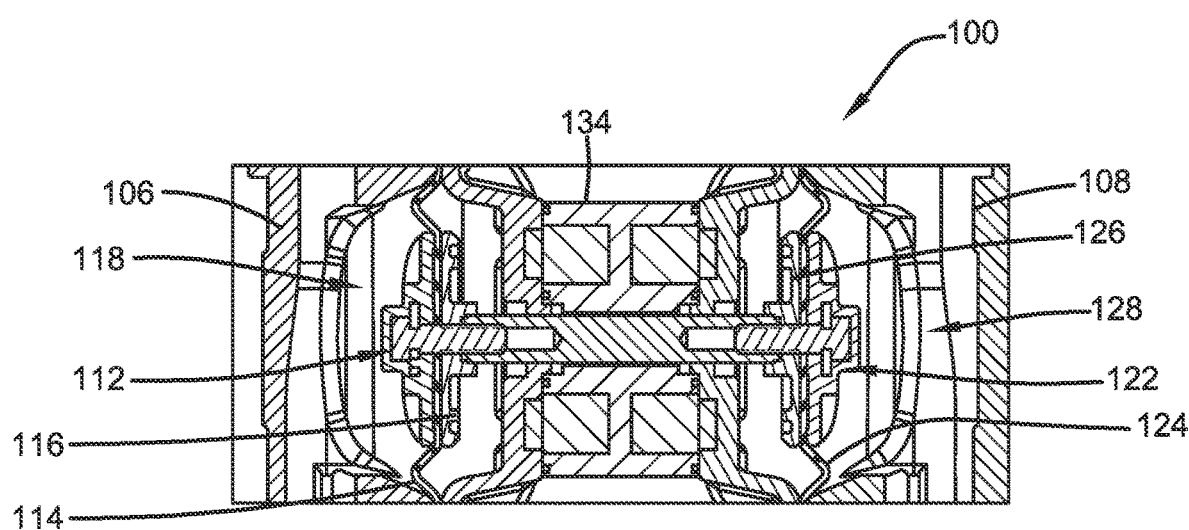
FIG. 2 is a cross-sectional view of a portion of a pump illustrating the internal features of the pump according to one implementation.

FIG. 1 is a component diagram illustrating an example implementation of a system that may utilize one or more portions of the aspects and examples described herein. In the implementation illustrated in FIG. 1, a pump 100 (illustrated as an AODD pump) includes an inlet housing 102, an outlet housing 104, a first diaphragm chamber housing 106, a second diaphragm chamber housing 108, and a center section 110 disposed between the first and second diaphragm chamber housings 106, 108. In the illustrated example, and with reference also to FIG. 2, the first diaphragm chamber housing 106 includes a first diaphragm assembly 112 comprising a first diaphragm 114 and a first diaphragm plate 116. The first diaphragm 114 is coupled to the first diaphragm plate 116 and extends across the first diaphragm chamber housing 106, thereby forming a movable wall defining a first pumping chamber 118 and a first diaphragm chamber 120. The second diaphragm chamber housing 108 is substantially the same as the first diaphragm chamber housing 106 and includes a second diaphragm assembly 122 comprising a second diaphragm 124 and a second diaphragm plate 126. The second diaphragm 124 is coupled to the second diaphragm plate 126 and extends across the second diaphragm chamber housing 108 to define a second pumping chamber 128 and a second diaphragm chamber 130. A connecting rod (not shown) is operatively connected to and extends between the first and second diaphragm plates 116, 126. The center section 110 also includes a valve body housing 134 and valve body disposed within the valve body housing 134.

It should be noted that while various examples are described in connection with and usable with a pump having a particular configuration, the systems and methods described herein may also be utilized with other types of pumps having different configurations to detect leaks. For example, the pump may comprise other valve or displacement mechanisms.

In one example, a leak detector 150 (illustrated in FIG. 3) is used with or on the pump 100 to detect a leak, such as caused when the first diaphragm 114 and/or the second diaphragm 124 reaches end of life. In one or more configurations, the leak detector 150 is configured to be positioned to provide an early warning. As should be appreciated, the leak detector 150 can be positioned in different locations.

As described in more detail herein, one or more examples position a sensor, such as one optical sensor 200 (e.g., a wireless optical sensor), in the exhaust or exhaust flow path. In operation, the optical sensor 200 is non-intrusive compared to other conductive sensors commonly used for liquid leak detection. In various examples, by providing the optical sensor 200 in a wireless Internet of Things (IoT) solution, immediate alerts can be sent to users by way of multiple communication modes (e.g., text, email, cellular telephone call, etc.). In one example, using a transmitter, such as a long range radio (LoRa), allows for the user to install only one gateway receiver to cover a large area. Also, the gateway can be installed in a closed environment remote and/or at a distance (e.g., far away) from the industrial environment in which the pump 100 is located.

Figure 3:
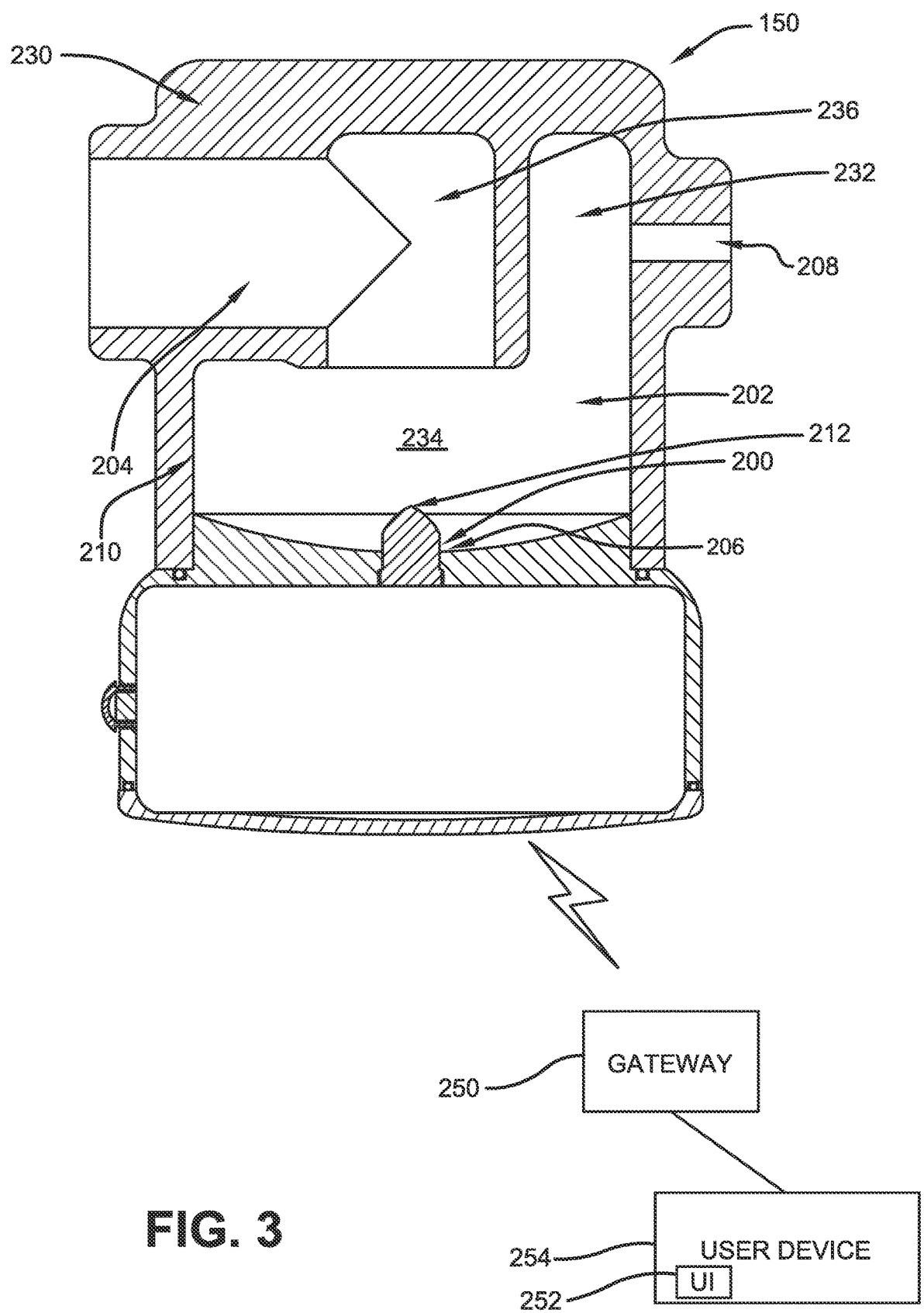
FIG. 3 is a cross-sectional view of a leak detector according to one implementation.

In one example, as shown in FIG. 3, the leak detector 150 is configured as a leak detection system that includes the optical sensor 200 provided within a reservoir 202 (defined within and/or by a housing 230 configured to facilitate detection of a leak as described in more detail herein) in the exhaust (e.g., positioned within an exhaust flow path of the pump 100) to sense or detect a diaphragm leak and provide a corresponding notification (e.g., report findings to the cloud and/or an end user). The reservoir 202 in one or more examples is configured to rapidly release any condensation or moisture in the air and only provide an alert (e.g., transmit an alert signal or alert notification to a user device 254) if there is a true diaphragm failure. The geometry (e.g., shape and arrangement) of the reservoir 202 is configured to increase the accuracy of sensing a leak, and reduce the chance of a false alert caused by moisture in the air supply.

More particularly, in the illustrated example, the geometry defines an inlet 208 with a tangential configuration at the entrance of the reservoir 202 that allows exhaust air to move at a high velocity into the reservoir 202 and carrying wet air out an outlet 204. That is, the configuration of the reservoir 202, including the size, shape and/or orientation of the chamber(s) defined by the reservoir 202, as well as other portions (e.g., the geometry of the inlet 208), creates a vortex (e.g., a vortex flow or vortex fluid flow) within the reservoir 202 in various examples. The vortex causes contaminants (e.g., non-air particles) to settle onto the sensor 200 and air to leave the reservoir 202 through the outlet 204. In various examples, the reservoir 202 defines a specialized chamber that captures condensed fluid instead of evaporated fluid.

As can be seen, in the illustrated example, the inlet 208 is configured as an opening into a top portion of the reservoir 202 and defines a passage or pathway that extends a distance horizontally into a sub-chamber 232 that is vertically oriented within the housing 230 (e.g., defines a vertical or tangential path, illustrated as perpendicular to the opening of the inlet 208). The sub-chamber 232 is fluidly coupled to a main chamber 234 of the reservoir 202 and in which the sensor 200 is located. Similar to the configuration of the inlet 208, the outlet 204 defines an opening (forming an exit path from the main chamber 234) into the top portion of the reservoir 202 and defines a passage or pathway that extends a distance horizontally to a vertically extending passage or pathway formed by a sub-chamber 236 fluidly coupled to the main chamber 234. In some examples, the tangential configurations form a circuitous path through the reservoir 202. This geometry creates a vortex within the reservoir 202 to facilitate leak detection as described in more detail herein. It should be noted that while the main chamber 234 is illustrated having a concave lower end, different shapes and configurations are contemplated.

In operation, the pumping media, which has a higher density than that of the wet air, is driven by the centrifugal forces to move relative to the fluid motion toward a side wall 210 of the reservoir 202 and then accumulate at a bottom 206 of the reservoir 202 on a top of a sensor prism 212 of the optical sensor 200. That is, the reservoir 202 in various examples is configured to have a geometry that forms a collection reservoir or collection chamber that allows, for example, contaminants indicative of a leak to settle onto the optical sensor 200 (with air moving out of the reservoir 202). For example, as described herein, one or more implementations of the leak detector 150 have a geometry or configuration that includes a circuitous path from the inlet 208 to the outlet 204 that causes heavier contaminants from the leak to be forced or directed to the wall and down to the optical sensor 200. In the various implementations, the geometry or configuration causes the lighter, gaseous form of water or humidity to not collect or condense, and are forced out of the reservoir 202, thereby reducing the occurrences of false alerts caused by humidity in the exhaust air/gas.

As such, the optical sensor 200 senses a leak condition in various examples by detecting contaminants that have settled at the bottom of the reservoir 202 and/or on the optical sensor 200. It should be appreciated that the detection of the contaminants by the optical sensor 200 can be performed using any suitable detection technique, such as any technique capable of discriminating between air and contaminants, discriminating between different fluids, etc. In some examples, the optical sensor is configured to only sense or detect liquids. That is, the contaminants in these examples are liquids. In these examples, this sensing or detecting prevents false alarms from solid particles, such as dirt, that can trigger the sensor and subsequent alarm.

In one example, the bottom 206 of the reservoir 202 is fully encapsulated with a potting compound to form an enclosure that houses electronics, a radio and a battery, with the optical sensor 200 positioned at and extending upward from the bottom 206 of the reservoir 202. That is, the bottom 206 contains one or more operational components that allow for detecting a leak and/or transmitting information relating to the detected leak with at least a portion of the optical sensor 200 extending into the chamber formed by the reservoir 202 (e.g., a detecting portion of the optical sensor, such as the sensor prism 212 extends into the main chamber 234). It should be noted that the various components can be configured to provide different operating characteristics, such as based on the type of pump 100, the material being pumped, etc. In one example, the optical sensor 200 is an optical level instrument, such as a photoelectric liquid level sensor. However, various examples of the present disclosure contemplate the use of other types of sensors, such as other types of optical level instrument sensors, for example, other types of single point level sensors.

Figure 4A:
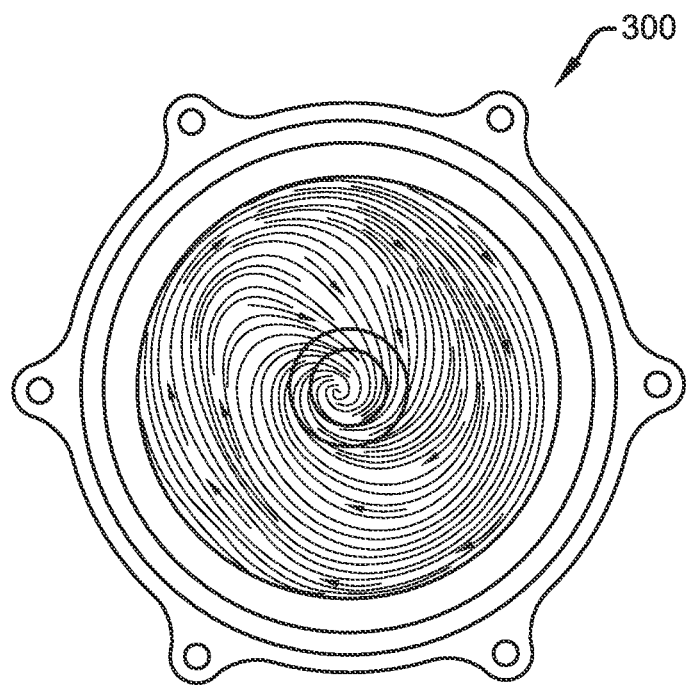
FIGS. 4A and 4B illustrate a computational fluid dynamics (CFD) simulation of a leak detector according to one implementation.
Figure 4B:
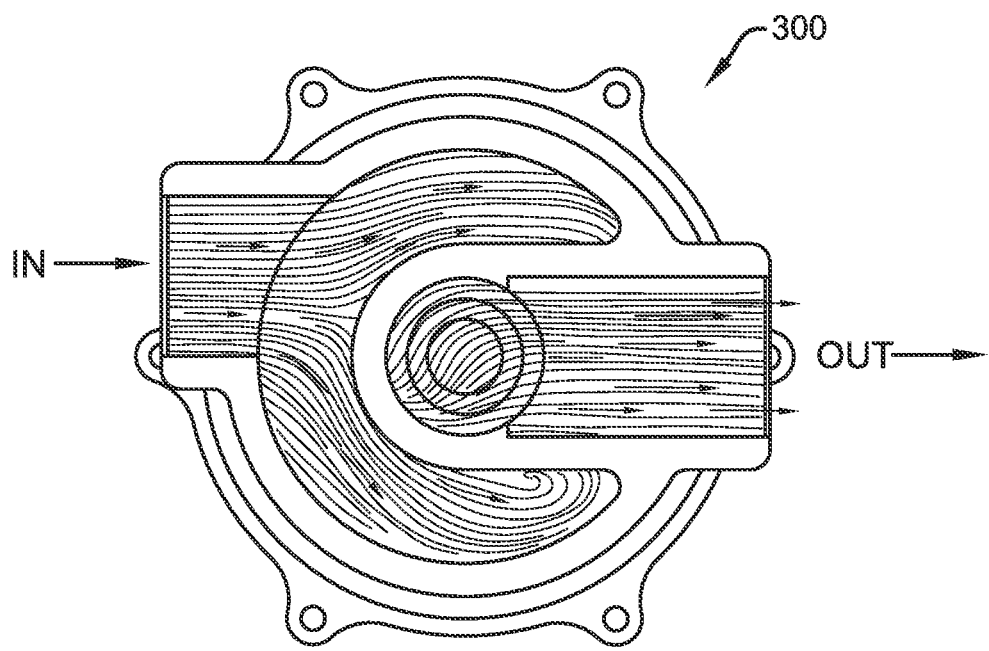
Figure 5:
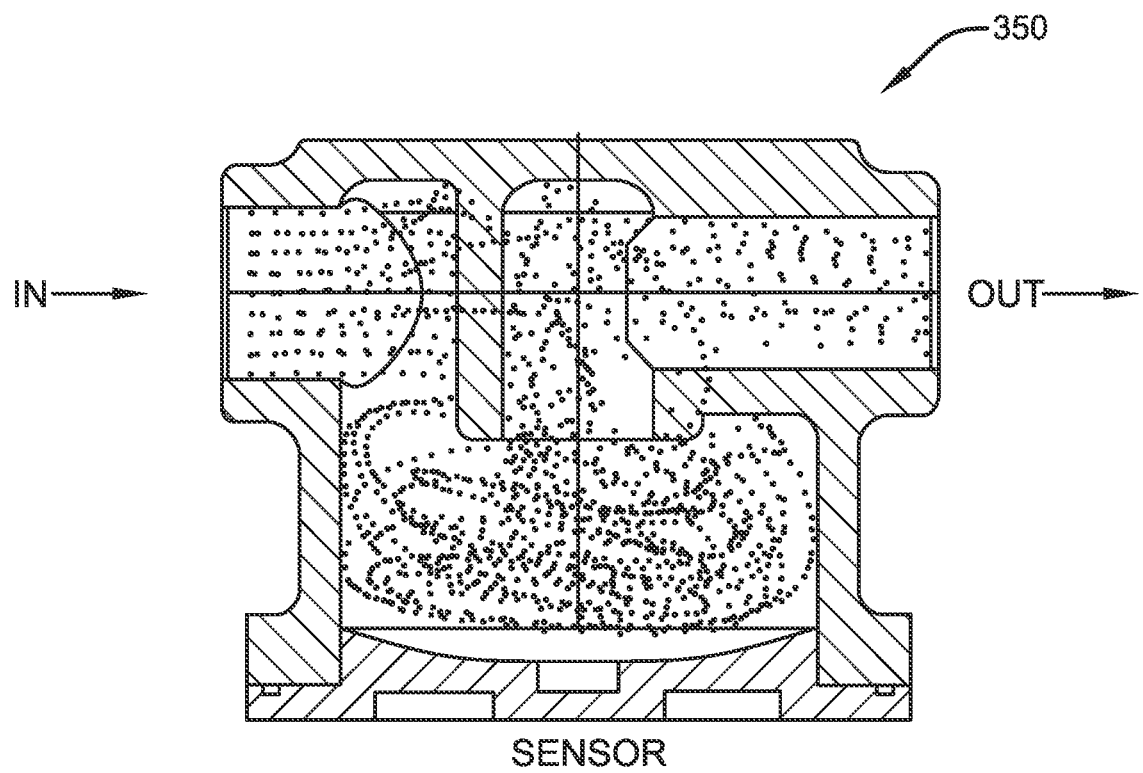
FIG. 5 illustrates another CFD simulation of a leak detector according to one implementation.

FIGS. 4A, 4B, and 5 illustrate CFD simulations 300 and 350 illustrating the relative position and orientation of the portions/components of the leak detector 150 in one example. That is, the simulation was used to determine the correct placement of the air inlet, exit and sensor location for maximum velocity and fluid collection. In the simulations 300 and 350, the spheres represent air and the ribbons represent a dense fluid, wherein FIG. 4A is a bottom view, FIG. 4B is a top view, and FIG. 5 is a side view. As can be seen, the simulations 300 and 350 show the circular motion that in various examples is created by the tangential inlet, namely the inlet 208 having the tangential configuration as described in more detail herein. That is, in various examples, the one or more tangential paths as described herein create the motion illustrated by the CFD simulations 300 and 350.

Using the CFD simulations and a CFD analysis, it was confirmed that high condensation in the air did not show or result in false alerts with the herein describe examples of the leak detector 150. Only when water was introduced into the exhaust stream simulating a diaphragm failure was the sensor 200 triggered/alerted of a leak. That is, false positive leak detections (such as resulting from "wet air") are reduced or eliminated with the herein described detector configuration. In some examples, the leak detection has an accurate and fast reaction time when sensing liquid in the air stream from the diaphragm leak and does not trigger any false alerts. Moreover, as should be appreciated, all of the components are enclosed in one unit that is simple to install and has no exposed wires. And, the use of a long range radio in the battery operated device allows for communication with a single gateway 250, such as communication of up to five miles. This configuration reduces the number of gateways and simplifies the installation and communication with the leak sensing device.

With respect to communications to and from the leak detector 150, in one example, the gateway 250 is a gateway device (e.g., a programmable or configurable gateway device) that is capable of bidirectional communication, which allows user control through a user interface (UI) 252, as well as to receive transmissions from the leak detector 150 (e.g., information or notifications relating to a leak). In operation, in one example, using a LoRa based remote controller with a transceiver that can output a minimum of three volts (3V), the output power is used to power a metal-oxide-semiconductor field-effect transistor (MOSFET), which can be connected to a valve to turn off the pump 100 or provide an alarm. In some examples, the user interface 252 is part of or linked to an "office based" console to monitor and/or detect different conditions of a plurality of sensors, including the optical sensor 200.

In some examples, a user can specify (via a user input received at the user interface 252 on the sensor arrangement or at a remote location, such as at the user device 254) how the leak is to be controlled. For example, the control of the leak can be accomplished by closing valve(s) in the air system before or after the compressed air enters and leaves the pump 100. In various examples, the user is able to specify how alerts are received (e.g., timing, type of notification, etc.) and how the leak is controlled. For example, some users are concerned with air entering the liquid process, while other users are concerned with the leak escaping to the atmosphere. With one or more examples disclosed herein, the user can specify which valves are used and when the valves are used. As such, in various examples, the user has full control over the pump 100 if a diaphragm failure occurs in contrast to typical pump systems with a shut off valve that do not have an IoT solution allowing remote control of the pump from anywhere in the world.

Figure 6:
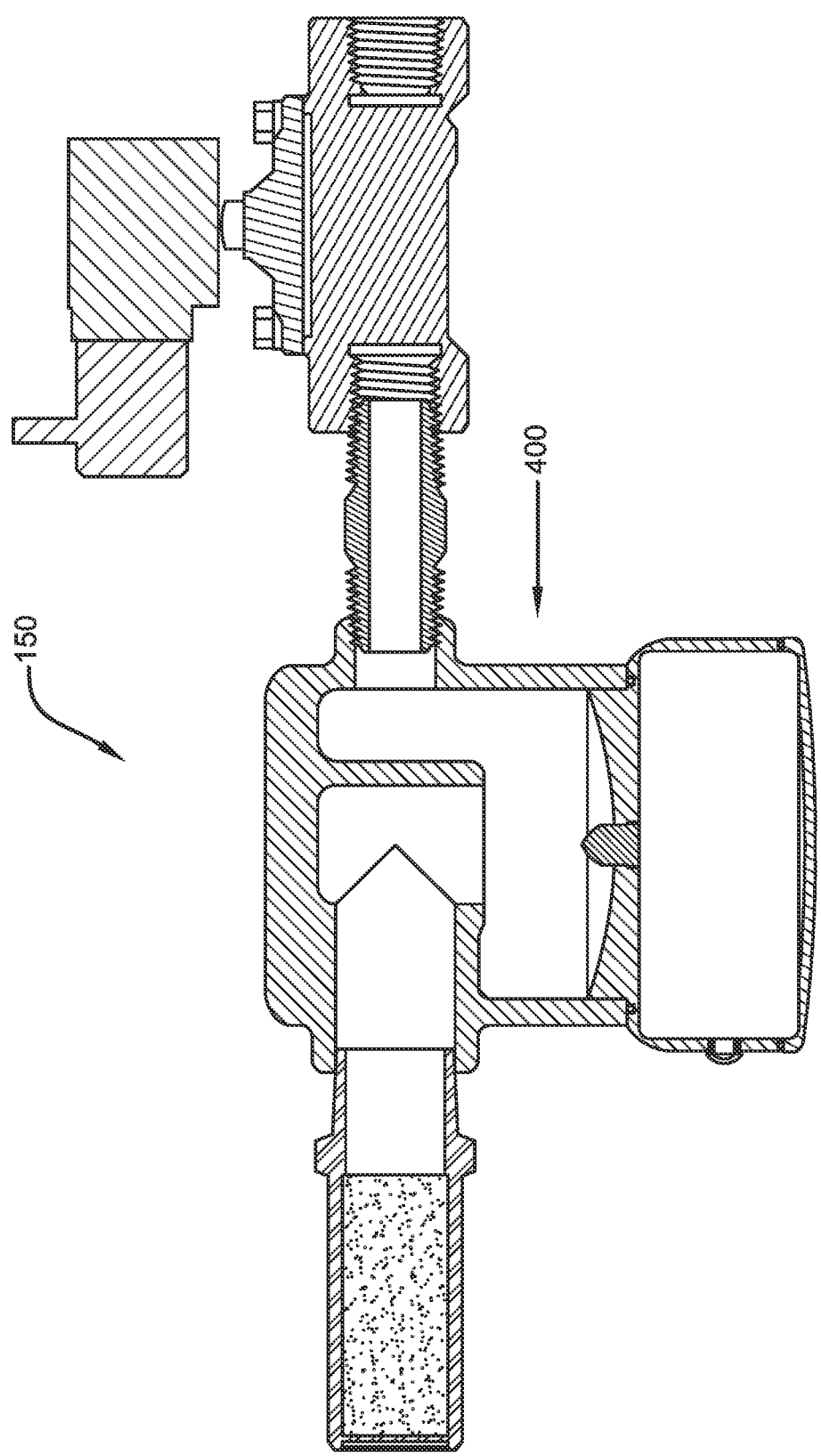
FIG. 6 is a diagram illustrating an operational configuration of a leak detector according to one implementation.

Thus, in various examples, the leak detector 150 having the optical sensor 200 within the reservoir 202 is provided in the exhaust or exhaust flow (see FIG. 6) to detect a diaphragm leak and transmit or report the leak detection (e.g., one or more details relating to the detected leak) to the cloud and end user via the gateway 250. That is, the leak detector 150 is installed or positioned at or along an exhaust path 400 of the pump 100. In various examples, the leak detector 150 is modular in design and installed at the air exhaust and/or configured to capture exhaust air. Once the leak is detected, the end user has the option, for example, to remotely turn off a shutoff valve via the UI 252 to stop the leak. In some examples, the user has the option to preset the valve to automatically close, close after a defined time, or wait for the user to signal the valve to close. In various examples, the user is also alerted that the pump is turned off. It should be noted that other options are contemplated relating to the control of the valve, notifications provided, user settings, etc. That is, the control and notification features described herein are merely for example. Different controls and notifications can be provided, such as based on the type of pump, type of detection desired, etc.

In various examples, one or more methods are provided for leak detection. For example, one or more methods include configuring a chamber as the reservoir 202 and installing the optical sensor 200 therein as described in more detail herein to form the leak detector 150. The arrangement is then installed at the air exhaust of a pump to provide leak detection as described in more detail herein.

Figure 7:
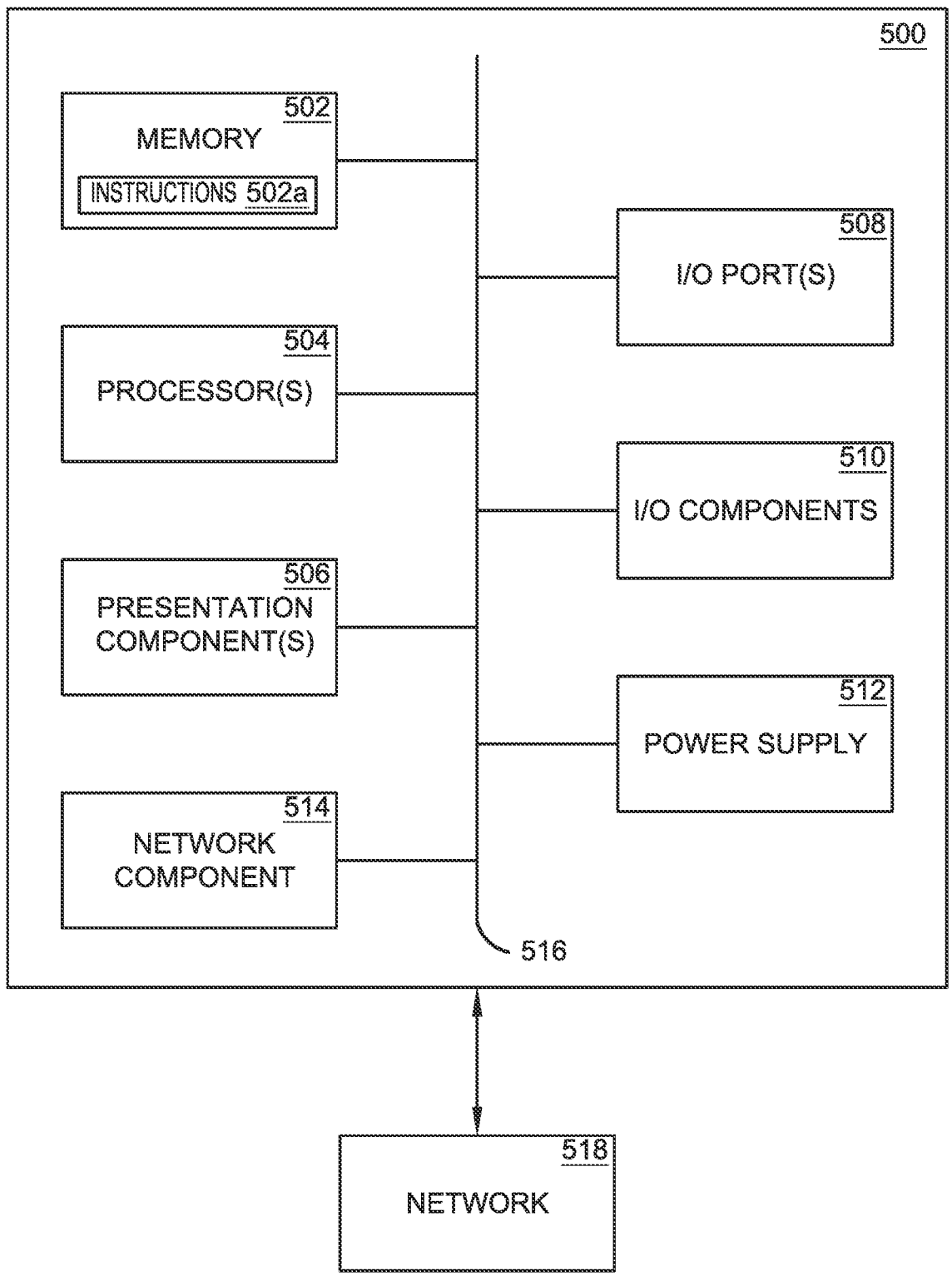
FIG. 7 is a block diagram of an example computing environment suitable for implementing various examples of leak detection and reporting.

With reference now to FIG. 7, a block diagram of a computing device 500 suitable for implementing various aspects of the disclosure is described (e.g., a leak sensing or monitoring system and/or aspects of the user device 254). FIG. 7 and the following discussion provide a brief, general description of a computing environment in/on which one or more or the implementations of one or more of the methods and/or system set forth herein may be implemented (e.g., one or more controls as described herein). The operating environment of FIG. 7 is merely an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of "computer readable instructions" executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

In some examples, the computing device 500 includes a memory 502, one or more processors 504, and one or more presentation components 506. The disclosed examples associated with the computing device 500 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 7 and the references herein to a "computing device." The disclosed examples are also practiced in distributed computing environments, where tasks are performed by remote-processing devices that are linked through a communications network. Further, while the computing device 500 is depicted as a single device, in one example, multiple computing devices work together and share the depicted device resources. For instance, in one example, the memory 502 is distributed across multiple devices, the processor(s) 504 provided are housed on different devices, and so on.

In one example, the memory 502 includes any of the computer-readable media discussed herein. In one example, the memory 502 is used to store and access instructions 502a configured to carry out the various operations disclosed herein. In some examples, the memory 502 includes computer storage media in the form of volatile and/or nonvolatile memory, removable or non-removable memory, data disks in virtual environments, or a combination thereof. In one example, the processor(s) 504 includes any quantity of processing units that read data from various entities, such as the memory 502 or input/output (I/O) components 510. Specifically, the processor(s) 504 are programmed to execute computer-executable instructions for implementing aspects of the disclosure. In one example, the instructions 502a are performed by the processor 504, by multiple processors within the computing device 500, or by a processor external to the computing device 500. In some examples, the processor(s) 504 are programmed to execute instructions such as those illustrated in the flow charts discussed herein and depicted in the accompanying drawings.

In other implementations, the computing device 500 may include additional features and/or functionality. For example, the computing device 500 may also include additional storage (e.g., removable and/or non-removable) including, but not limited to, magnetic storage, optical storage, and the like. In one implementation, computer readable instructions to implement one or more implementations provided herein may be in the memory 502 as described herein. The memory 502 may also store other computer readable instructions to implement an operating system, an application program and the like. Computer readable instructions may be loaded in the memory 502 for execution by the processor(s) 504, for example.

The presentation component(s) 506 present data indications to an operator or to another device (e.g., leak detection notifications or warnings). In one example, the presentation components 506 include a display device, speaker, printing component, vibrating component, etc. One skilled in the art will understand and appreciate that computer data is presented in a number of ways, such as visually in a graphical user interface (GUI), audibly through speakers, wirelessly between the computing device 500, across a wired connection, or in other ways. In one example, the presentation component(s) 506 are not used when processes and operations are sufficiently automated that a need for human interaction is lessened or not needed. I/O ports 508 allow the computing device 500 to be logically coupled to other devices including the I/O components 510, some of which is built in. Implementations of the I/O components 510 include, for example but without limitation, a microphone, keyboard, mouse, joystick, pen, game pad, satellite dish, scanner, printer, wireless device, camera, etc.

The computing device 500 includes a bus 516 that directly or indirectly couples the following devices: the memory 502, the one or more processors 504, the one or more presentation components 506, the input/output (I/O) ports 508, the I/O components 510, a power supply 512, and a network component 514. The computing device 500 should not be interpreted as having any dependency or requirement related to any single component or combination of components illustrated therein. The bus 516 represents one or more busses (such as an address bus, data bus, or a combination thereof). Although the various blocks of FIG. 7 are shown with lines for the sake of clarity, some implementations blur functionality over various different components described herein.

The components of the computing device 500 may be connected by various interconnects. Such interconnects may include a Peripheral Component Interconnect (PCI), such as PCI Express, a Universal Serial Bus (USB), firewire (IEEE 1394), an optical bus structure, and the like. In another implementation, components of the computing device 500 may be interconnected by a network. For example, the memory 502 may be comprised of multiple physical memory units located in different physical locations interconnected by a network.

In some examples, the computing device 500 is communicatively coupled to a network 518 using the network component 514. In some examples, the network component 514 includes a network interface card and/or computer-executable instructions (e.g., a driver) for operating the network interface card. In one example, communication between the computing device 500 and other devices occurs using any protocol or mechanism over a wired or wireless connection 520. In some examples, the network component 514 is operable to communicate data over public, private, or hybrid (public and private) connections using a transfer protocol, between devices wirelessly using short range communication technologies (e.g., near-field communication (NFC), Bluetooth® branded communications, or the like), or a combination thereof The connection 520 may include, but is not limited to, a modem, a Network Interface Card (NIC), an integrated network interface, a radio frequency transmitter/receiver, an infrared port, a USB connection or other interfaces for connecting the computing device 500 to other computing devices. The connection 520 may transmit and/or receive communication media.

Although described in connection with the computing device 500, examples of the disclosure (e.g., one or more controls or interfaces) are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure, such as controllers or monitors, are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprises computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion.

As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A leak detector comprising:
   a reservoir having a chamber with an inlet and an outlet, wherein the inlet is configured to couple to an exhaust of a pump and the reservoir is configured to create a vortex flow therein; and
   an optical sensor positioned at a bottom of the reservoir, a detecting portion of the optical sensor extending into the chamber,
   wherein the vortex flow causes one or more liquids to settle at the bottom of the reservoir on the optical sensor and the one or more liquids are indicative of a leak, and
   wherein the optical sensor is configured to detect the one or more liquids.

2. The leak detector of claim 1, further comprising a transmitter configured to transmit a leak detection notification to a remote user interface in response to the optical sensor detecting the one or more liquids.

3. The leak detector of claim 2, wherein the user interface is configured to receive one or more user inputs to define at least one control operation for a valve of the pump interface in response to the optical sensor detecting the one or more liquids.

4. The leak detector of claim 2, wherein the pump comprises a diaphragm pump and the leak detection notification is indicative of a failure of the diaphragm pump.

5. The leak detector of claim 1, wherein the reservoir defines a circuitous path from the inlet to the outlet configured to create the vortex flow that causes one or more liquids to settle at the bottom of the reservoir, wherein the circuitous path is further configured to force or direct a lighter, gaseous form of water or humidity out of the reservoir and to not collect or condense therein.

6. The leak detector of claim 5, wherein the circuitous path from the inlet to the outlet comprises a tangential configuration at an entrance of the reservoir defined by the inlet.

7. The leak detector of claim 6, further comprising a housing having the reservoir therein, wherein the inlet comprises an opening, wherein the tangential configuration comprises a passage extending a distance horizontally into a sub-chamber within the housing, wherein the sub-chamber is vertically oriented within the housing and extends to the bottom of the reservoir, and wherein the tangential configuration defines a tangential path perpendicular to the opening of the inlet.

8. The leak detector of claim 1, wherein the vortex flow creates a flow with a circular motion within the reservoir.

9. The leak detector of claim 1, wherein the bottom of the reservoir is fully encapsulated with a potting compound to form an enclosure that houses one or more of electronics, a radio, and a battery coupled to the optical sensor, and wherein the detecting portion of the optical sensor extends upward from the bottom of the reservoir.

10. The leak detector of claim 1, wherein the vortex flow is configured to allow a pumping media having a higher density than that of the wet air to be driven by centrifugal forces to move relative to fluid motion toward a side wall of the reservoir and then accumulate at the bottom of the reservoir on top of the optical sensor.

11. The leak detector of claim 10, wherein the detecting portion of the optical sensor comprises a sensor prism.

12. The leak detector of claim 1, wherein the inlet, the outlet, and a location of the optical sensor are configured for a maximum velocity and fluid collection within the reservoir.

13. The leak detector of claim 1, wherein the one or more liquids comprises one or more contaminants indicative of the leak.

14. A leak detector comprising:
    a reservoir having a chamber with a tangential inlet and an outlet; and
    an optical sensor positioned at a bottom of the reservoir, a detecting portion of the optical sensor extending into the chamber, and
    wherein the reservoir and tangential inlet are configured having a geometry that creates a vortex flow in the reservoir and the reservoir forms a collection chamber for contaminants indicative of a leak to settle onto the optical sensor, and
    wherein the tangential inlet is configured to couple to an exhaust of a pump and create the vortex flow in the reservoir that causes pumping media having a higher density than that of wet air to be driven by the centrifugal forces to move relative to fluid motion toward a side wall of the reservoir and settle on a top of the optical sensor.

15. The leak detector of claim 14, wherein the contaminants comprise one or more liquids and the optical sensor is configured to detect the one or more liquids indicative of the leak.

16. The leak detector of claim 14, wherein the inlet is configured to couple to an exhaust of a pump and the optical sensor is configured to sense liquid in the air stream from a leak of the pump.

17. The leak detector of claim 14, further comprising a housing configured as a single unit having the reservoir and optical sensor enclosed therein.

18. The leak detector of claim 17, wherein the housing has no exposed wires.

19. A method of pump leak detection, the method comprising:
configuring a leak detector to have a reservoir having a chamber with an inlet and an outlet, wherein the inlet is configured to couple to an exhaust of a pump and the reservoir is configured to create a vortex flow therein; and
configuring the reservoir to have an optical sensor positioned at a bottom of the reservoir, wherein a detecting portion of the optical sensor extends into the chamber,
wherein the vortex flow causes one or more liquids to settle at the bottom of the reservoir on the optical sensor and the one or more liquids are indicative of a leak, and
wherein the optical sensor is configured to detect the one or more liquids.

* * * * *